July 14, 1936. J. T. ZINKOWETSKY 2,047,723
AUTOMOBILE CRASHPROOF SAFETY DEVICE
Filed July 17, 1935
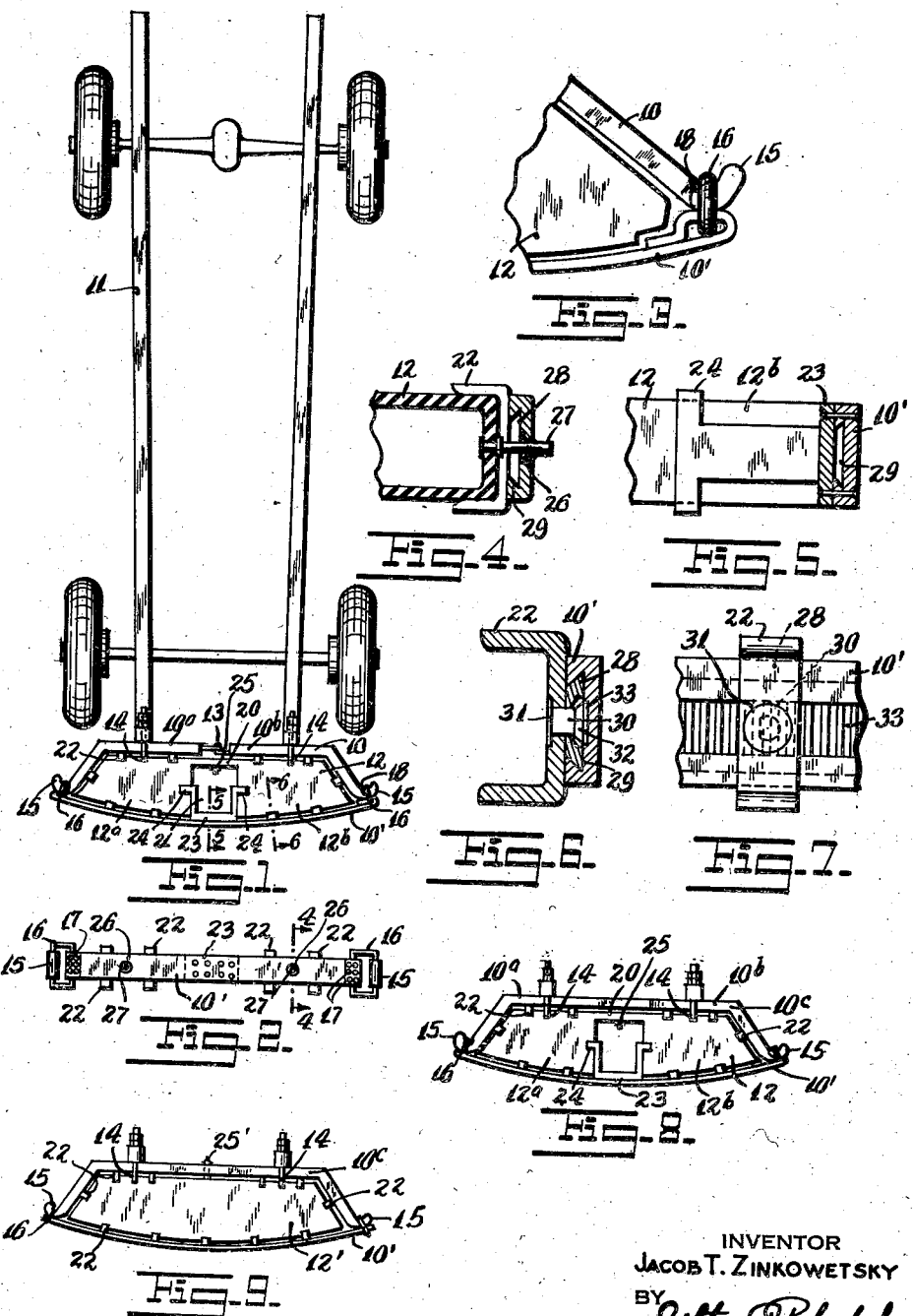
INVENTOR
JACOB T. ZINKOWETSKY
BY
ATTORNEY Patented July 14, 1936

2,047,723

UNITED STATES PATENT OFFICE 2,047,723

AUTOMOBILE CRASHPROOF SAFETY DEVICE

Jacob T. Zinkowetsky, New York, N. Y.

Application July 17, 1935, Serial No. 31,773

7 Claims. (Cl. 293—55)

This invention relates to new and useful improvements in an automobile crash proof safety device.

The invention has for an object the construction of safety devices which are adapted to be attached upon the chassis of a vehicle, at the front and at the back, or in either place as desired, and which are capable of absorbing shocks to a very large degree, so as to make the automobile immune in collisions of certain types.

More particularly, as it relates to each safety device, the invention proposes the use of a pneumatic cushion arranged within a frame having a resilient front side, and said frame being attached upon the chassis in such a manner, that when shocks and stresses are impinged against the frame, they will be communicated to the pneumatic cushion and be absorbed.

A still further object of this invention is a novel construction of the frame to facilitate the mounting and removal of the pneumatic cushion when desired.

Still further, the invention contemplates a construction of pneumatic cushion which is adapted to be inflated very easily, similar to the inflation of a tire, to compensate for lost air.

Another object of this invention is the construction of a device as mentioned which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a plan view of an automobile chassis equipped with a crash proof safety device according to this invention.

Fig. 2 is a front elevational view of Fig. 1.

Fig. 3 is a fragmentary plan view of a portion of Fig. 1.

Fig. 4 is a fragmentary sectional view taken on the line 4—4 of Fig. 2.

Fig. 5 is a fragmentary sectional view taken on the line 5—5 of Fig. 1.

Fig. 6 is a fragmentary sectional view taken on the line 6—6 of Fig. 1.

Fig. 7 is an elevational view looking from the left of Fig. 6.

Fig. 8 is a view similar to Fig. 1, but illustrating another embodiment of the invention.

Fig. 9 is another view similar to Fig. 1 but illustrating a still further modified form of the invention.

The crash proof safety device, according to this invention, consists of a frame 10 having a resilient front side 10′ and adapted to be attached upon the front or rear ends of the chassis 11 of an automobile, in place of the conventional bumpers. Within the frame there is mounted a pneumatic cushion 12 arranged in such a manner as to contact with the front resilient side 10′ to absorb shocks.

The frame 10 includes a pair of sections 10ª and 10ᵇ connected with each other by a hook and eye construction 13. Loop shaped anchor bolts 14 partially encircle the sides of the sections 10ª and 10ᵇ and rigidly connect these portions upon the chassis 11. The hook and eye construction 13 is arranged at the center of the chassis between the adjacent ends of the frame sections. The sides of the frame sections 10ª and 10ᵇ diverge, and at the ends are formed with hook portions 15.

The resilient front side 10′ has two ends equipped with hingedly mounted loop members 16 adapted to engage the hook portions 15 for the connection of these parts. The loop members 16 have portions of their sides engaged within bent ends of the front side 10′. These bent ends are held in fixed position by the provision of a plurality of rivets 17 engaging through the ends and the adjacent material of the front side 10′. Stop projections 18 are formed near the bases of the hooks 15 for limiting inward swinging of the loop members 16.

The pneumatic cushion 12 is composed of two sections 12ª and 12ᵇ connected along a small area by a solid connection portion 20. The construction is such that there is a space 21 between the adjacent ends of the cushion sections 12ª and 12ᵇ. A plurality of U-shaped supporting fingers 22 are mounted in the frame 10, including the front side 10′, and engage the material adjacent the edges of the pneumatic cushion for holding the cushion in position. An auxiliary fixed frame 23 is attached upon the inner side of a front member 10′, and at the ends is formed with fixed U-shaped elements 24 engaging the material adjacent the edges of the cushion sections.

The connecting portion 20 is equipped with a conventional air valve 25 to inflate the cushion sections 12ª and 12ᵇ. Further details as to the valves will not be given in this specification since similar valves are generally known: for example, valves on the tires of automobiles. For each of the cushion sections 12ª and 12ᵇ there is an opening 26 in the front side 10′. Studs 27 extending from cushion 12 are engageable in said openings 26 and are provided for the purpose of keeping the cushion sections in place.

Each of the U-shaped members 22 is formed with a dovetailed tongue 28 upon its center, said tongues engaging in receiving grooves 29 formed upon the inner sides of the frame 10. The arrangement is such that the U-shaped members 22 may be moved along the sides of the frame to various desired positions. Each of the U-shaped members 22 carries a stud 30 which has an inner head 31 adapted to be depressed by the material of the pneumatic cushion when the latter element is inflated. In the depressed condition of the studs 30, the front ends 32 engage serrations 33 formed in the bases of the grooves 29. The U-shaped members 22 are thus locked in fixed positions. When the pneumatic cushion is deflated a sufficient amount, it is possible to move the U-shaped supporting members 22 to desired positions since the studs 30 will automatically move to disengaged positions as the U-shaped members are moved along. A feature of the adjustment of the members resides in the fact that the pneumatic cushion may be supported at different areas so as to eliminate undue wear of the cushion at fixed areas.

In Fig. 8 a modified form of the invention has been disclosed which distinguishes from the previous form merely in the construction of the frame of the device. More particularly, the device is equipped with a frame 10c having end sections 10a and 10b integral with each other. In other respects the construction is identical and similar parts may be recognized by the same reference numerals.

In Fig. 9 the pneumatic cushion 12' is illustrated without sections, as a single cushion member and may be inflated by an air valve 25'.

The operation of the device is as follows: In the operative condition, the pneumatic cushion is inflated with a pre-determined pressure of air, depending merely upon design. Should the automobile strike some object, or should some object strike the automobile on the safety device, which is located in prominent positions, the shock will be absorbed by the pneumatic cushion. The resilient front side 10' has sufficient "give" to permit the transfer of the stresses.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. An automobile crash proof safety device, comprising a frame having a resilient front side and adapted to be attached upon the front and rear ends of an automobile chassis in place of the bumpers, and a pneumatic cushion within the frame in intimate contact with said front side, said frame being composed of members connected together, including a pair of members connected with a hook and eye construction upon adjacent ends urged into fixed engagement with each other by said pneumatic cushion.

2. An automobile crash proof safety device, comprising a frame having a resilient front side and adapted to be attached upon the front and rear ends of an automobile chassis in place of the bumpers, and a pneumatic cushion within the frame in intimate contact with said front side, said frame being composed of sectional pieces connected together, including a pair of members connected with a hook and eye construction upon adjacent ends, the free ends of said members diverging and terminating in hooks, and said front side being equipped with loop members engageable with the hooks for the connection of the parts.

3. An automobile crash proof safety device, comprising a frame having a resilient front side and adapted to be attached upon the front and rear ends of an automobile chassis in place of the bumpers, and a pneumatic cushion within the frame in intimate contact with said front side, said pneumatic cushion being composed of sections, connected together, each of the sections being equipped with joining air passage and a common air inflation valve.

4. An automobile crash proof safety device, comprising a frame having a resilient front side and adapted to be attached upon the front and rear ends of an automobile chassis in place of the bumpers, and a pneumatic cushion within the frame in intimate contact with said front side, and U-shaped clips mounted upon said frame and engaging the edges of the material of said cushion for holding the cushion in position, said clamps having dove-tailed shaped tongues engaging in receiving grooves on the inner sides of the frame to permit adjustments of the positions of the clips.

5. An automobile crash proof safety device, comprising a frame having a resilient front side and adapted to be attached upon the front and rear ends of an automobile chassis in place of the bumpers, and a pneumatic cushion within the frame in intimate contact with said front side, said pneumatic cushion being composed of sections, connected together, U-shaped clips movably mounted on said frame and supporting said cushion and means for holding the U-shaped clips in fixed positions operative by the material of the cushion in the inflated condition of the cushion.

6. An automobile crash proof safety device, comprising a frame with grooves having a resilient front side and adapted to be attached upon the front and rear ends of an automobile chassis in place of the bumpers, and a pneumatic cushion within the frame in intimate contact with said front side, said pneumatic cushion being composed of sections, connected together, U-shaped clips movably mounted on said frame and supporting said cushion, and means for holding the U-shaped clips in fixed positions operative by the material of the cushion in the inflated condition of the cushion, comprising studs slidable through the U-shaped clips and having heads engaging the pneumatic cushion, the other ends of said studs having teeth engaging rack teeth formed in the bases of said grooves.

7. An automobile crash proof safety device, comprising a frame with grooves having a resilient front side and adapted to be attached upon the front and rear ends of an automobile chassis in place of the bumpers, and a pneumatic cushion within the frame in intimate contact with said front side, said pneumatic cushion being composed of sections, connected together, U-shaped clips movably mounted on said frame and supporting said cushion, and means for holding the U-shaped clips in fixed positions operative by the material of the cushion in the inflated condition of the cushion, comprising studs slidable through the U-shaped clips and having heads engaging the pneumatic cushion, the other ends of said studs having teeth engaging rack teeth formed in the bases of said grooves, said pneumatic cushion being formed or held together by sections with a space therebetween, a support bracket mounted upon the front side of said frame and terminating in fixed U-shaped clips engaging the materials of the cushion at the separated portions thereof.

JACOB T. ZINKOWETSKY.